United States Patent
Blankenbecler et al.

[19]

[11] Patent Number: 6,104,446
[45] Date of Patent: Aug. 15, 2000

[54] COLOR SEPARATION OPTICAL PLATE FOR USE WITH LCD PANELS

[76] Inventors: Richard Blankenbecler, 974 Cottrell Way, Stanford, Calif. 94305; Maurice Levis, 35 Mizzen Cir., Hampton, Va. 23664; Helen Gourley, 389 San Benito Way, San Francisco, Calif. 94127

[21] Appl. No.: 08/769,699

[22] Filed: Dec. 18, 1996

[51] Int. Cl.⁷ .................................................. G02F 1/1335
[52] U.S. Cl. .................... 349/5; 349/57; 349/95
[58] Field of Search ................... 349/5, 57, 95, 349/62, 8; 353/38, 98, 102; 359/615, 640

[56] References Cited

U.S. PATENT DOCUMENTS

| | | | |
|---|---|---|---|
| 4,686,519 | 8/1987 | Yoshida et al. ............................ | 349/95 |
| 5,044,737 | 9/1991 | Blankenbecler . | |
| 5,236,486 | 8/1993 | Blankenbecler et al. . | |
| 5,262,896 | 11/1993 | Blankenbecler . | |
| 5,467,206 | 11/1995 | Loiseaux et al. . | |
| 5,541,774 | 7/1996 | Blankenbecler . | |
| 5,760,850 | 6/1998 | Nakanishi et al. ........................... | 349/5 |
| 5,764,319 | 6/1998 | Nishihara .................................... | 349/95 |
| 5,764,323 | 6/1998 | Fukuda ........................................ | 349/5 |
| 5,777,804 | 7/1998 | Nakamura et al. ........................ | 353/98 |
| 5,781,257 | 7/1998 | Gal et al. .................................... | 349/95 |
| 5,959,704 | 9/1999 | Suzuki et al. ............................... | 349/5 |

OTHER PUBLICATIONS

Hamada et al, "Brightness Enhancement of an LCD Projector by a Planar Microlelns Array", *SID 92 Digest*, pp. 269–272.

Ko et al, "High Efficiency Color Filters For LC Projection System Applications", *Eurodisplay Proceed.* 1996.

Loiseaux et al, "Compact Spatio–Chromatic Single–LCD Projection Architecture", Asia Display, 95, pp. 87–89.

Jouben et al, "Dispersive Holographic Microlens Matrix For SIngle LCD Projection", *SPIE* vol. 2650, pp. 243–252.

Oikawa et al, "High NA Planar Microlens For LD Array" Tsukuba Research Laboratory Nippon Sheet Glass Co., Ltd., pp. 1–9.

Hamada et al, "A New Bright Single Panel LC–Projection System Without A Mosaic Color Filter,"Liquid Crystal Display Group, Sharp Corp. pp. 422–423.

Sperger et al, "High Performance Patterned All–Dielectric Interference Colour Filters For Display Applications" pp. 81–83.

*Primary Examiner*—William L. Sikes
*Assistant Examiner*—Tai V. Duong
*Attorney, Agent, or Firm*—Eliot S. Gerber

[57] ABSTRACT

A color separation optical plate is described which is superimposed onto a transmissive LCD panel. The color separation plate separates incident white light into its red/green/blue (RGB) components and guides each component through the appropriate sub-pixel (dot) of the LCD panel. The color separation plate utilizes a microprism array of direct vision microprisms each having a combination of refractive and gradient index optics to concentrate the light onto the appropriate dot and to separate the colors. This combination has the theoretical capability of increasing color LCD panel transmissivity by as much as a factor of six.

21 Claims, 8 Drawing Sheets color separation plate  FIG.5A  LCD panel

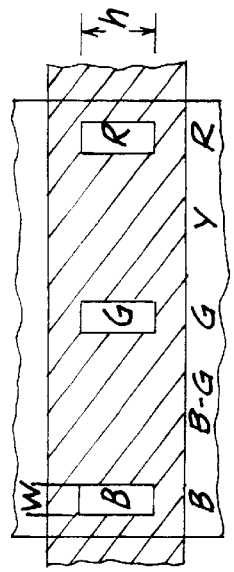
FIG.13
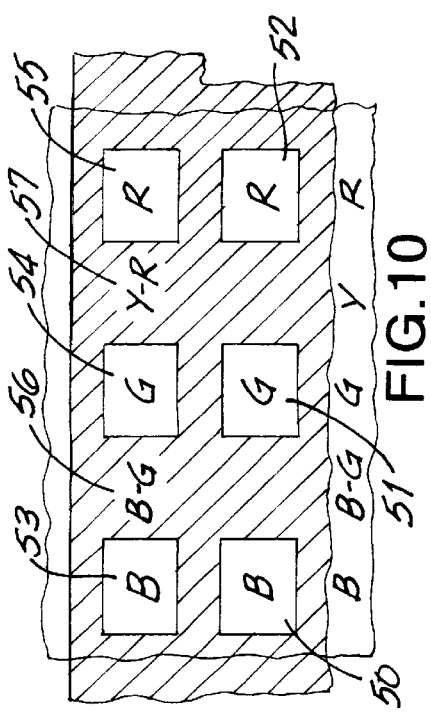
FIG.10
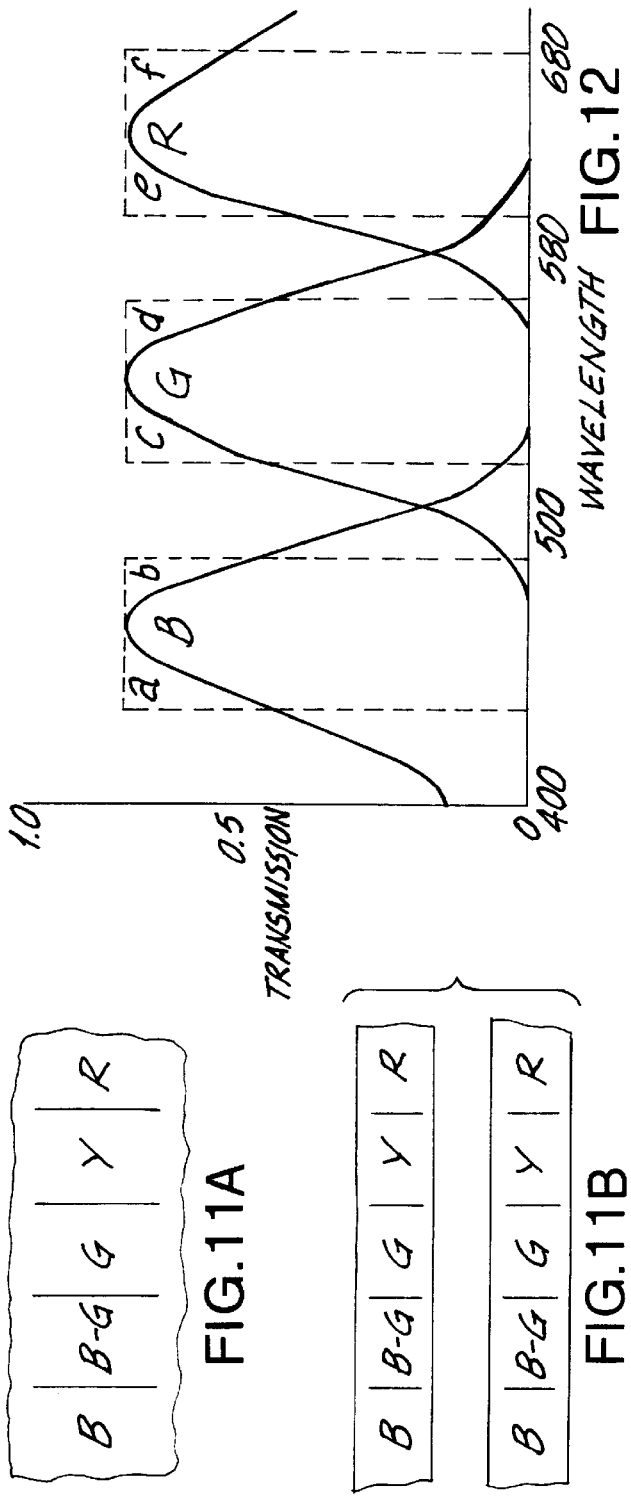
FIG.12
FIG.11A
FIG.11B

COLOR SEPARATION OPTICAL PLATE FOR USE WITH LCD PANELS

FIELD OF THE INVENTION

The present invention relates to electronic display systems and more particularly to color LCD (Liquid Crystal Display) systems.

BACKGROUND OF THE INVENTION

LC (Liquid Crystal) or LCD (Liquid Crystal Display) projectors and LC displays, using transmissive LCD panels, are widely employed, both in monochrome (black and white) and color. For example, LCD direct viewing displays, using a single active matrix LCD, are used in lap top and notebook computers and LCD projectors are used to display computer-generated data on a screen. The LCD panel consists generally of a liquid which is held between a pair of transparent plates. Optical transmission, on a light valve pixel-by-pixel basis, is controlled by an active matrix of thin film transistors or diodes deposited on the plates.

Color LCD is preferred to monochrome because it is more life-like and vivid. However, color LCD presents serious problems. First, the color LCDs which are presently commercially available are dim. They may therefore be difficult to see and their colors are not bright or vivid. They generally only transmit about one-third or less of the incident light (luminous flux) compared to a monochome LC panel, due mainly to absorption and spatial distribution of its color filters. If the back light output is raised to make an LCD brighter and to compensate for the poor light transmittal of the LCD panel, the battery life would decrease, which would be a problem in portable computers and other portable devices. In non-portable devices, where power need not be conserved, an increased light output at the lamp may result in greater heat in the device, shorter light source life and a more complex and expensive white light source.

A direct-view display of 2-D images is a pictorial display where the operator looks directly at the light-generating surface and not at a projected image. Typically such direct view displays are presently generated by either a CRT (Cathode Ray Tube) or a direct-view transmitting-type LCD with diffuse back light. Some examples of direct-view displays are as follows: (1) Portable computers—now built with a continuous luminous backlight directly behind the LCD; (2) Avionics displays—CRT's displaying flight and external sensor data; (3) Map displays driven by global position satellite information combined with local vehicle status data, usually CRTs or backlighted LCDs; (4) Instrument displays—generally small CRTs presenting measurement data in highly processed form, such as temperature profile maps from radiometric scanners, spectral data from chemical analysis instruments, maps of defects in semiconductor wafers, etc. Generally the pictorial displays (image displays) are computer generated digital pictures formed by assigning a color/brightness value to each pixel in an X-Y (row-column) matrix of pixels. The usual aspect ratio of such displays is 3:4 vertical to horizontal, and the usual number of row elements is 200 to 1300.

The presently commercially available direct-view displays present a number of limitations and disadvantages. CRTs are long tubes which extend far behind the viewing surface. They require high voltage for operation. Their screen is illuminated by phosphors whose properties limit the brightness of the display. If one sought to increase brightness, the necessary beam current would reduce the life of the CRT. Besides the safety hazards (high voltage, fragility) the CRT is intrinsically inefficient for a single viewer because each activated region of the phosphor radiates forward into a complete hemisphere, and loses some light backwards as well. Most of the emitted light travels outward away from the viewer's line of sight. Home television sets employ large CRTs, up to several feet diagonal, but they are limited in the size of their screens and the brightness of their images.

An alternative to CRT is an LCD panel which is lighted from behind its rear face (backlighting). In a laptop computer, a large luminous area behind the LCD sends light forward to the LCD. Light spreads over a wide angle. For pixels set to "transmit", the light passes through the pixel, emerging with the same angle spread as its incident beam—that is, over a complete hemisphere, +/−90 degrees in any plane. Light at large angles is useless, partly because it does not reach the viewer's eyes and partly because the LCD contrast at large angles is substantially degraded.

The efficiency of the LCD panel is limited by the angle at which the light reaches its rear (entry) face. Only light within a small cone angle around the perpendicular to the LCD panel is useful. The size of a direct-view LCD display is limited by commercially available panels, now about 12 inches diagonal, available in either monochrome or color. In the future, large LCD panels may replace projectors for some applications where a fixed image size is acceptable, for example, home television.

Projection LCD panels are either placed on top of an overhead projector, which acts as the light source and projection apparatus of the system, or are integrated into a system which contains the light source and projection optics.

These projection systems often use expensive, high-power lamps requiring high starting voltage. The lamps have limited lifetime, typically 300 to 1000 hours. They must be kept free from contamination at risk of explosion or fracture, and must be replaced and re-aligned periodically. They operate at extremely high surface temperatures, usually requiring fan air-cooling. A reflector used with such a lamp is generally a metal, low-expansion glass, coated ceramic or quartz, to withstand the local high temperature. All arc lamps generate infrared radiation. In xenon, the infrared (IR) is part of the radiating gas spectrum; and in metal halide lamps the bulb, at extremely high surface temperature (about 600 degrees C.) is a source of longer IR radiation peaking at about 4 microns. The entire bulb envelope and the electrodes radiate to the rest of the system.

The size of the projected image is not limited by the image-forming device (LCD) but by the illuminance required at the image. The projected image must be clearly visible in a room with normal to subdued illumination. Light level at the screen, in turn, is limited by the thermal properties of the image-forming devices. At high light levels, they overheat and cease to function.

The LCD panel used in a projector operates best over a narrow incident angle range (usually +/− a few degrees about its "bias" angle, maybe 7 degrees). Therefore the projector's illuminator must convert the source radiation into a beam with this limited angle spread about the direction of propagation. This will be called "angle population". Any light at greater angles degrades the contrast of the LCD.

LCD panels which project color images have an array of pixels typically 640×480 for VGA resolution, 800×600 for SVGA resolution or 1024×768 for XGA resolution. Other resolutions are also available, such as EWS (Electronic Work Station) at 1280×1024. These pixels are controlled typically by an array of tiny transistors (TFT—Thin Film Transistors) or diodes. Each pixel is divided into three rectangular shaped "sub-pixels" (dots); however, each "sub-pixel" may be considered an independent "pixel" because it is an independently controlled light transmission valve. Consequently, a color LCD having 640×480 VGA resolution has (640×3)×480 or 921,600 rectangular shaped sub-pixels (independent light valves) which are called "dots" or "sub-pixels". Each of the three dots has a different color pass-band dye filter passing selectively one of the primary RGB (Red, Green, Blue) colors. A color image is formed by electronically controlling each dot as a shutter (light valve or light modulator), and mixing the RGB colors for each pixel in such a way as to render the desired color on the image.

The RGB color bands employed in electronic imaging are defined under a variety of standards. They are defined in terms of their x,y chromaticity coordinates based on the CIE (Commission International de l'Eclairage) 1931 convention. They can also be described in terms of their spectral distribution curves. There are a number of standards at present. One standard is set by NTSC (National Television System Committee) for the U.S. and North America. A second standard is set by the EBU (European Broadcasting Union) for use in Europe. A third standard is set by SMPTE (Society of Motion Picture And Television Engineers) for use in the electronic projection field. In general terms, the colors are more vibrant (saturated), the closer the x,y coordinates are to the edges of the chromaticity chart. The colors are richer if a certain area of the chart is larger, that area being defined by a triangle connecting the RGB points on the chromaticity chart (color gamut).

Each sub-pixel (dot) of the conventional color LCD panel is dyed one of the RGB colors. As a result of this approach, about two thirds of the white light that falls onto a color dot will be lost. For example, white light falling on a red dot will be allowed to transmit only the red, thus losing the green and blue that are part of the initial white light falling on the dot. Depending on the filter, when the center of the color is selected as the center of the cut-off filter, the light spectra between the pass-band filters is also not transmitted, even though the spectra of the filters overlap. Alternatively, the RGB dots (filters) can be arranged in an array on a separate plate, called a mosaic color filter or stripe color filter. For example, a mosaic filter or LCD may use a triangular pattern (delta) in which each pixel of the LCD is associated with RGB sub-pixels or may use a vertical (orthogonal) stripe pattern in which the vertical stripes (columns) are RGB and are orthogonal to rows of pixels.

A black mask (web) is used between sub-pixels to prevent light leakage and to shield the TFT array from direct light.

Color LCD panels are higher in cost and have greater complexity than monochrome LCD panels. In color, the number of pixels is increased by a factor of three to maintain the same resolution. It is relatively difficult and expensive to produce an accurate and long-lived color filter matrix on an LCD panel.

Increasing the transmissivity of color LCD panels has extremely attractive applications both in projection and direct viewing. For this reason a number of devices have recently been proposed to accomplish this goal.

In U.S. Pat. No. 5,467,206, incorporated by reference, and the article "Compact Spatio-Chromatic Single-LCD Projection Architecture", Loiseaux et al, ASIA Display '95, pgs. 87–70, there is described a phase volume grating (diffractive transmission grating) which separates white light into RGB. That phase volume grating is a thin plastic film, about 10 microns thick, which uses optical duplication of a hologram for its grating, i.e., coherent beam interference recorded in a photopolymer film. The RGB beams are transmitted to a microlens array, with the RGB directed at different angles to each microlens. The microlenses are aligned with an LCD panel having sub-pixels. The microlenses direct the R light to the R sub-pixel, the G light to the G sub-pixel and the B light to the B sub-pixel. The LCD panel controls which of the sub-pixels are off or on (transmitting or non-transmitting), so that the separated RGB are either transmitted or not transmitted.

An alternative projection system is described in the article Hamada et al, "A New Bright Single Panel LC-Projection System Without A Mosaic Color Filter", IDRC (Int. Display Research) '94 Proceedings, 422 (1994), pages 422,423. It uses three dichroic mirrors which are stacked at angles to each other. Those mirrors break up collimated white light into many RGB beams which are directed, at different incident angles, to a single monochrome TFT-LCD (Thin Film Transistor-Liquid Crystal Display). The TFT-LCD has three sub-pixels associated with each lens of a microlens array. Each microlens directs RGB at a different angle toward its appropriate RGB sub-pixel.

The article "High Efficiency Color Filters For LC Projection System Applications" by Ko et al, *Eurodisplay Proced.* 1996, describes a "micro-dichroic mirror array". A color filter for an LCD panel uses a microprism array in which the microprisms are coated with dichroic mirrors. The microprisms are not direct view prisms.

It has also been suggested, in the literature, that the RGB colors may be projected to the LCD panel in sequence using a color wheel or rotating prism, see P. Jansen et al, "A novel single light valve high brightness HD projector" EURODISPLAY Proceed. 249 (1993). Alternatively, it has been suggested that three diffraction microlens array plates may be used to separate RGB; see Joubert et al, "Holographic elements for LCD projector", OE'LASE '95 SPIE Proceed. 2406 (1995).

Since none of these suggestions are presently commercially available, it is difficult to estimate their light efficiency, complexity and economic feasibility. However, it is believed that they all present various difficulties in arriving at a high light transmittal system which is mechanically and economically feasible.

U.S. Pat. No. 5,506,929, incorporated by reference, discloses a beam collector and light pipe having an adjacent set of microprisms which may be used for backlighting LCDS. The microprisms have a height on the order of one mil (39.37 micrometers).

SUMMARY OF THE INVENTION

The present invention is of an LCD (Liquid Crystal Display) which provides a full range of color over the visible spectrum and of an improved backlighting panel. The LCD provides as much as six times the light (luminous flux) as a conventional dyed color matrix LCD. Its colors are bright (well saturated). Consequently, a brighter image may be displayed without using a higher output bulb, without increasing the heat from the bulb and without shortening the bulb's life and, in portable devices, without draining the battery.

It is believed that this improved color LCD may be used to provide a bright and clear image in projection television; using a highly efficient color single LCD panel in place of three CRTs (Cathode Ray Tube) or three LCDs. It is a simpler and less costly system, and it provides a brighter image while providing lower power to the lamp.

The present invention uses a source of parallel white light (backlight) which may be a conventional white light source with an appropriate collimation lens; but preferably, for direct viewing, is the light pipe array of the present invention. That light pipe array is not used in projection systems. Depending on the size of the LCD, and its intended use, the white light source may be a collimated flat cold light source (direct-view display) or a bright point source or other type of collimated white light source (projector display). A laser beam is not required. It is preferred, if the source is a bulb, that the light be collected and directed by a curved mirror. The light source may be incandescent bulbs, halogen, metal halide bulbs and plasma arc bulbs, e.g., xenon or mercury.

The white light is directed onto a novel color separation plate. An entrance microlens array may, optionally, be used to direct the light onto the color separation plate. This entrance microlens array preferably comprises vertical cylindrical microlenses or spherical microlenses formed on the entrance face of the color separation plate.

It is a feature of the present invention to provide a novel illuminator panel (back light source) for LCD color panel view direct displays, such as portable computers and flat TV screens. The light source is a flat panel array of side-by-side light pipes (cells) with each light pipe being illuminated by three LEDs (Light Emitting Diodes) of three primary colors (RGB). For example, the illuminator panel may have 9–120 light pipes each throwing its light onto 1000 to 100,000 pixels of the LCD.

Preferably the illuminator panel for direct view is a honeycomb light pipe backlighting panel which creates an extended beam of white light with narrow angle population. The honeycomb consists of a set of reflective cells (light pipes) each containing a multiple of RGB LEDs. The cells are combined in hexagonal or rectangular packing, with narrow dead space boundaries between them.

Preferably the illuminator panel of reflective light pipes has cavities (cells) molded in plastic and coated for high reflectance inside the cavities. The thickness of the entire illuminator matrix (illuminator panel) is only about two to three inches. The overall size of the illuminator panel can be matched to any existing LCD. While present LCD panels are limited to portable computer sizes, the illuminator panel can be scaled to larger units simply by increasing the number of cells.

In the active matrix LCD panel there are three rectangular dots (sub-pixels) for each pixel of the LCD panel, i.e., a pixel is defined as three proximate sub-pixels. Each sub-pixel presents an aperture controlled by a TFT (Thin Film Transistor) light valve and does not have color dye. The sub-pixels are exactly alike. Preferably the colors transmitted through the sub-pixels meet the standard (minimum) color addition colors, as defined by NTSC, EBU or SMPTE, of Red (R), Green (G) and Blue (B). Each spectrum is a spectral band with the red, green and blue colors centered at the respective sub-pixels. However, since the entire visible spectrum may be transmitted, the light directed at the RGB sub-pixels may be wider in spectrum than light transmitted by the prior art color dot band-pass filters of a color mosaic LCD or the color bands defined by the various standards. A black mask matrix (web) which separates the sub-pixels is added to the color separation optical plate between the plate and the LCD panel, or the matrix is preferably applied on the LCD panel. The matrix will further separate the RGB bands and reject the undesired colors between the selected RGB bands. The color separation plate consists of an array of direct vision prisms (microprisms). In one embodiment a microprism is aligned with each pixel of the LCD plate. However, in the preferred embodiment, the microprisms are formed as elongated columns, each column being the height of the LCD panel and the width of about one complete pixel (three sub-pixels).

A direct vision prism (direct view prism) consists of a first prism of one index of refraction, a second prism of a different index of refraction, and may include one or two additional prisms. The preferred direct vision prism is a Wernicke prism having three prism elements and having flat entry and exit faces; although more than three prism elements can be used with some increase in complexity.

One shape, in cross-section, of the prisms is triangular; however, the prisms are preferably truncated for manufacturing reasons. The Wernicke microprisms are preferably formed by grooves on one face of a first flat sheet, grooves on both faces of a second flat sheet, and grooves on one face of a third flat sheet. The three sheets are preferably joined together, for example, fused or cemented, to form an integral transparent color separation plate. White light entering the first prism is broken up into a color spectrum upon exit from the last prism. The appropriate G color, at the color separation plate exit side, is in line with the axis of the entry white beam and the R&B colors are at angles to that axis.

Preferably the microprisms of the first sheet (plate) are formed by GRIN (Gradient Index) technique which permits varying the index of refraction in a highly controlled way and from front to back within the optical element, i.e., within a prism sheet. This provides the first microprism sheet with an accurately controlled index of refraction. The index gradient within the first prism (first prism sheet) is smooth (step-free) due to the controlled diffusion of the GRIN process. There is a step in index between the first and second prisms (first and second sheets) as well as between the second and third prisms. A function of the GRIN element is to eliminate the need for additional focusing lenses.

Each direct view microprism of the Wernicke Prism array is a tiny device, in the preferred range of 15–200 micrometers in width. In one embodiment, the first sheet (layer) is GRIN. The other two sheets are homogeneous at a chosen n (index of refraction). Each microprism at the exit side of the color separation plate is preferably aligned with a lens, i.e., a lens of a microlens array. Preferably the microlens array is a transparent glass, or plastic, plate having an array of micrometer width cylindrical lenses as protrusions on the exit face of the color separation plate (the microlens plate side facing the LCD plate). Each cylindrical lens, in height (column) extends from the top to the bottom of the LCD panel. The array of cylindrical lenses on the exit side of the color separation plate focuses the color spectra along vertical column stripes. These vertical stripes of RGB fall on the vertical columns of RGB sub-pixels.

The GRIN technique may also be used to form a two-element microprism array plate forming an entrance array to focus the incident white light on the sub-pixels of the color separation plate. That GRIN entrance array plate may be integral with the color separation plate.

A microlens array exit plate is preferably positioned next to the LCD panel. In one embodiment, for example, they are in contact. The LCD panel is a color type LCD panel having three sub-pixels, orthogonal to the vertical columns, each forming a pixel, however, without dye filter dots on the sub-pixels. The "sub-pixels" are on-off light valves that permit, or reject, transmission of the RGB light. The lenses of the microlens array plate directs the RGB portions of the rainbow color spectrum from each direct view prism onto a respective sub-pixel.

The dispersion of the various optical materials used in the color separation plate are chosen so that the green band (approximate range of 490–595 nm) (nanometers) goes through the middle dot, the blue band (approximate range of 400–490 nm) goes through one of the side dots and the red band (approximate range of 595–730 nm) goes through the other side dot of the same pixel. The center of the red range is approximately 230 nm from the green and the center of the blue range is approximately 100 nm from the green. The fact that the dispersion is not linear across the visible spectrum, and is lower towards the red than in the blue, allows for the choice of an index of refraction for the microprisms so that the centers of each color band are equidistant from the center of the green. Therefore, the center of green band lines up with the side dots, which are equidistant from each other. Dot pitch (distance between the centers of the rectangular dots) in a typical 6.4" diagonal SVGA panel using a-Si TFT (Amorphous Silicon Thin Film Transistor) is on the order of 50 microns. For future poly-Si (polycrystaline Silicon) panels in the 2" diagonal size and SVGA resolution it is expected to be in the order of 15 by 45 microns. The dot pitch defines the separation required between the centers of the RGB components.

A preferred embodiment of the optical color separation plate combines the refractive properties of a Wernicke prism with the optical properties of GRIN elements in a new combination we call "GRIN-Wernicke arrays". White light at various angles, typically cones of 5 to 10 degrees (half-cone angle), is directed onto the color separation plate which separates the light into its RGB components. The prismatic array of the color separation plate provides color dispersion (refractive). The color components are focused by the microlens array (which could precede or follow the microprism array) onto the appropriate dots of the LCD panel. The microlens arrays may be vertical stripes of cylindrical lenses or arrays of spherical segment lenses each one illuminating a particular dot or pixel.

The GRIN-Wernicke array color separation plate will provide for a good collection efficiency in terms of directing the desirable light through the open apertures and minimize the light that impacts the vertical black matrix, between the dots, that shields the TFT array from direct light. The focusing of the light will increase the transmissivity of the LCD panel/optical color separation plate combination.

In the event that further color tailoring is required for various applications, a patterned all dielectric color filter can be used interposed between the pixel dots and the color separation plate. Such dielectric color filters have less light loss than the color dye filters used on conventional color LCD plates.

The present invention reduces the light losses that occur with LCD dyed panel dots (sub-pixels). The color separation optical plate receives white light and separates white light into its RGB components and directs those components to the appropriate dot (sub-pixel). Red dots will only receive red light, etc. This increases the efficiency of the incident white light onto the LCD panel. The LCD panel will have the same three dots (sub-pixels) per pixel to accommodate the three primary colors RGB as a conventional color LCD panel. But no color dyes are used to separate the colors, since the colors have been separated by the color separation plate. Since the two out of the three RGB components are not absorbed on the LCD surface (as with dye colored dots) the LCD panel will operate much cooler for a given level of light flux. In many situations, the heating of the panel is the limiting factor in image brightness and achievable contrast. A panel operating above its design temperature, typically 50–60 degrees C., will have degraded contrast. The reduction in LCD panel manufacturing cost gained by eliminating the dye stripes (dye dots) is estimated at about 25–30%. Thus, the color separation plate for high-end projectors may be priced as much as $180, at this time, and the combined cost of LCD panel and optical color separation plate would be the same as that of the color dyed LCD panel. A typical 6.4" color LCD panel manufactured by Sharp is available, in O.E.M. (Original Equipment Manufacturer) quantities, for about $600 each (SVGA resolution). A gain of a factor of three in LCD panel transmissivity, due to the color separation function of the color separation plate, would be an advantage in the clarity and brightness of the projected image. It will provide substantially better performance at equal or lower cost.

The optical color separation panel incorporates special GRIN optics that concentrate the incident light on the open apertures presented by the sub-pixels of the LCD panel. The RGB is transmitted through the apertures and not absorbed by the vertical web; although a small portion is absorbed by the horizontal web. This enhancement of light collection could add another factor of two in light transmission efficiency. The overall transmissivity enhancement can be theoretically as high as a factor of six, compared to present commercially available LCD panels using color dyes.

It is presently estimated that as much as 30% of the white light from the light source may be transmitted by the LCD plate system of the present invention, i.e., a spectral efficiency of 30% of the incident light flux. This compares with possibly less than 7% using a conventional color dye matrix LCD plate.

BRIEF DESCRIPTION OF THE DRAWINGS

In the the accompanying drawings:

FIG. 5A is a top cross-sectional view of an integral optical plate and an LCD panel, in which the integral plate comprises an entry microprism plate, a color microprism separation plate, and an exit cylindrical microlens plate;

FIG. 10 is an enlarged rear plan view of six sub-pixels, constituting two pixels, of an LCD panel;

FIG. 11A is a front view of a portion of a rainbow visible spectrum produced by the embodiment of FIGS. 2, 3 or 5A;

FIG. 11B is a front view of two rainbow visible spectrums produced by two spherical microlenses;

FIG. 12 is a chart showing transmission as a function of wavelength generated by the sub-pixels of FIG. 10; and FIG. 13 is an alternative lay-out of the sub-pixels of an LCD panel;

DETAILED DESCRIPTION OF PREFERRED EMBODIMENT

Figure 1:
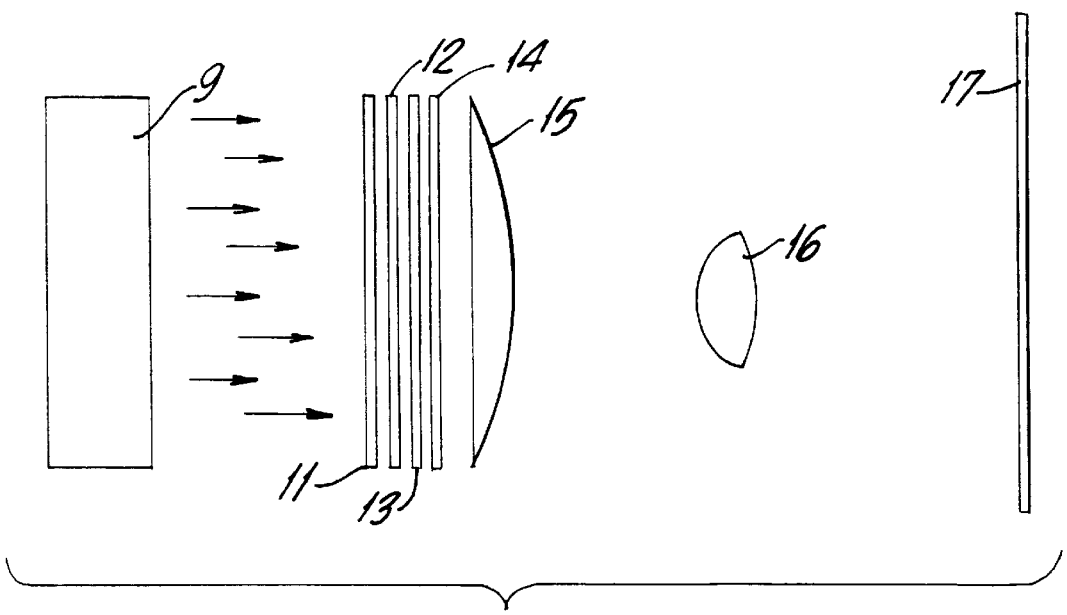
FIG. 1 is a schematic view of the projector system of the present invention.

As shown in FIG. 1, a white light source 9 generates well-collimated white light. For example, a bulb and parabolic mirror may produce collimated white light directed toward the color separation plate 12. The embodiment of FIG. 1 illustrates an LCD projector; but may also be used for other devices, such as projection television. The light source 9, which may be any suitable illumination system, should produce an approximately collimated beam with at least 1000 lumens. The light source should have a lifetime of at least 200 hours. The light source 9 may be cooled by an electric fan (not shown).

Preferably the light source 9 includes an arc source such as a metal halide bulb, although in alternative projectors an incandescent bulb or LEDs may be used, depending on the size, cost and use of the projector.

The LCD system of the present invention may also be used as a direct viewing system, for example, a color computer display, for battery operated laptop and notebook computers. In that case the light source 9 is preferably a cold source using relatively little power.

The light source 9 is well collimated. For example, if source 9, in a direct viewing system, is a cold source, its light may be collimated by a light control plastic film containing closely spaced parallel microlouvers, available as Light Control Film (TM—3M) from Edmund Scientific, Barrington, N.J. The microlouver spacing may be larger than the pixel spacing. For greater collimation two, or more, films may be joined, with their microlouvers parallel, but not necessarily aligned. The light control film is positioned between the light source 9 and the color separation plate.

Figure 3:
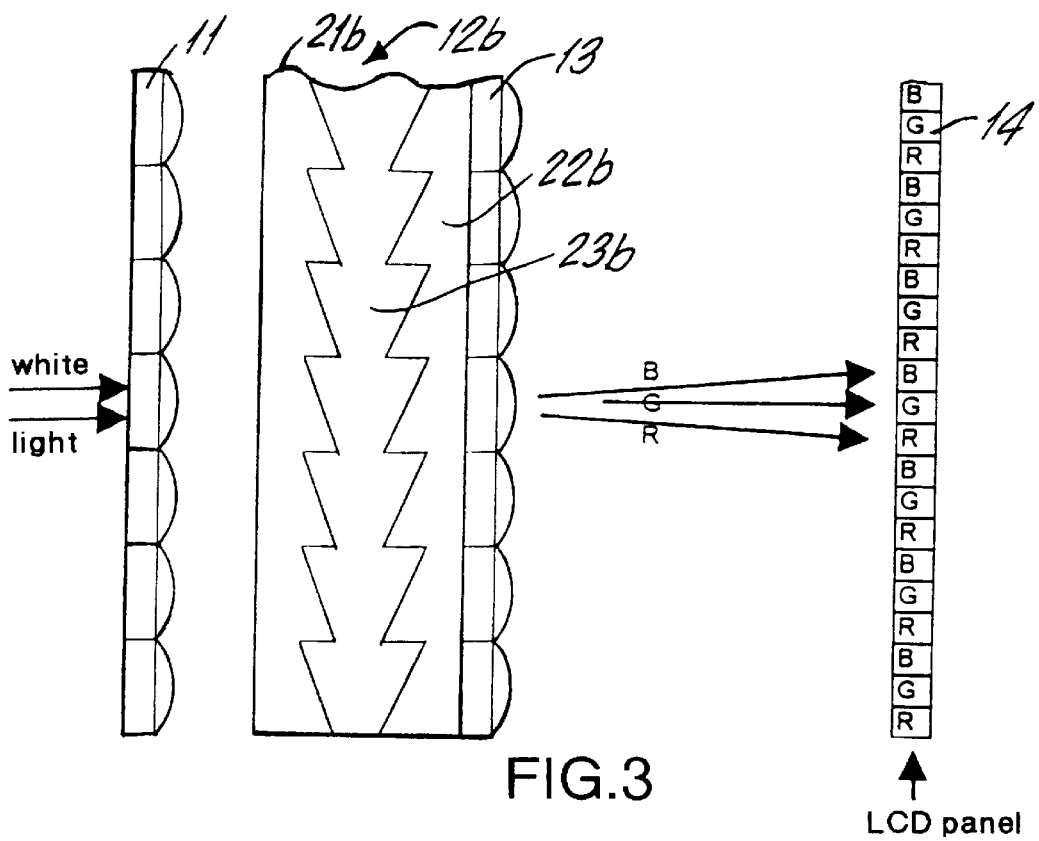
FIG. 3 is a top cross-sectional view of a cylindrical entry microlens array plate and an LCD panel.

An entrance microlens array 11 is positioned between the light source 9 and the color separation plate 12. This microlens array 11 is optional and its use depends on cost, space and light requirements. A suitable microlens array in this entry position focuses light from light source 9 on the LCD plate. One preferred microlens array 11 is a flat and thin glass plate having a close pack microlens structure, i.e., a honeycomb hexagonal close-packed structure which may be formed by the ion exchange method. That type of microlens array is described in Hamada et al, "Brightness Enhancement of an LCD Projector By A Planar Microlens Array", SID DIG. 92, 269272, incorporated by reference. In that article the microlens array was used with a pixel array on a 3-inch TFT-LCLV plate (Thin Film Transistor-addressed Liquid Crystal Light Valve). An alternative preferred entrance microlens array 11 is a plate of cylindrical condensing lenses, as shown in FIG. 3. The image generated by the LCD panel 14 is focused on screen 17 by field lens 15 and projection lens 16.

Figure 4:
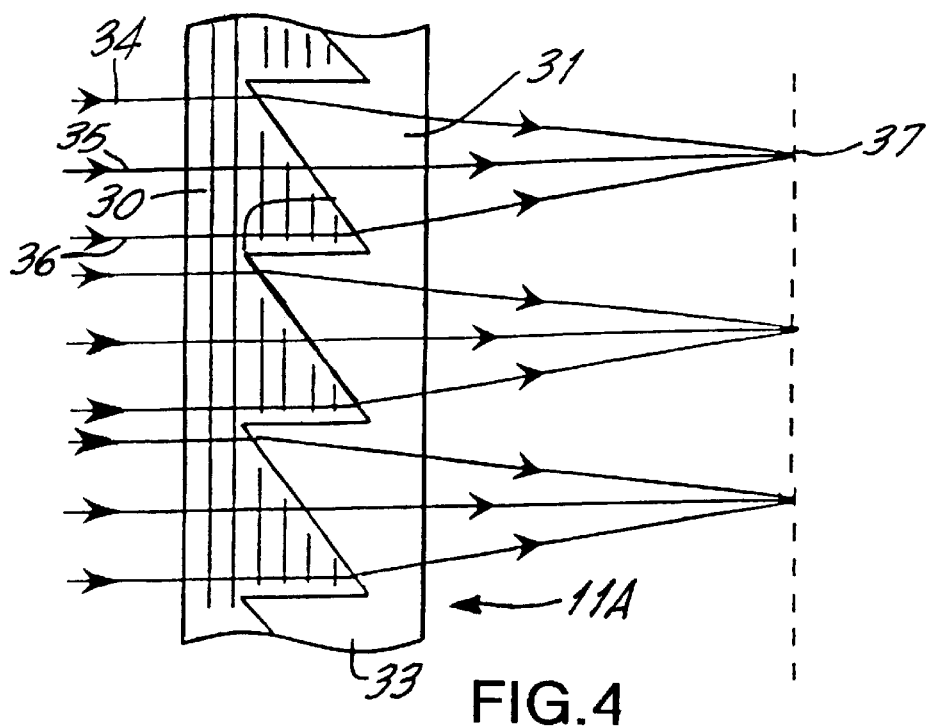
FIG. 4 is a top enlarged cross-sectional view of an entry microprism plate.

FIG. 4 shows an enlarged top cross-sectional view of an alternative microlens plate 11 labeled 11A. In plate 11A each microlens is a segmented axial gradient lens, preferably formed according to U.S. Pat. No. 5,541,774, incorporated by reference. The entry microprisms 30 are formed as a flat sheet (plate) 31 with ridges using GRIN, explained below. Alternatively, the first sheet 31 is formed of an optical transparent material (glass or plastic), without GRIN; but with a different index of refraction than the second sheet. The exit microprisms 31, without GRIN, are also formed as a flat sheet 33 which is in optical contact with sheet 31, for example, by cementing or fusion. The incident white light ray 34 is bent downward (as shown in FIG. 4), the light ray 35 is not bent and the light ray 36 is bent upwards. They are focused at line 37. Plate 11A acts as a set of side-by-side cylindrical lenses which produce vertical illumination lines 37 (going into the paper). Plate 11A, like plate 11 (cylindrical lenses) collimates and focuses the incident white light.

Figure 2:
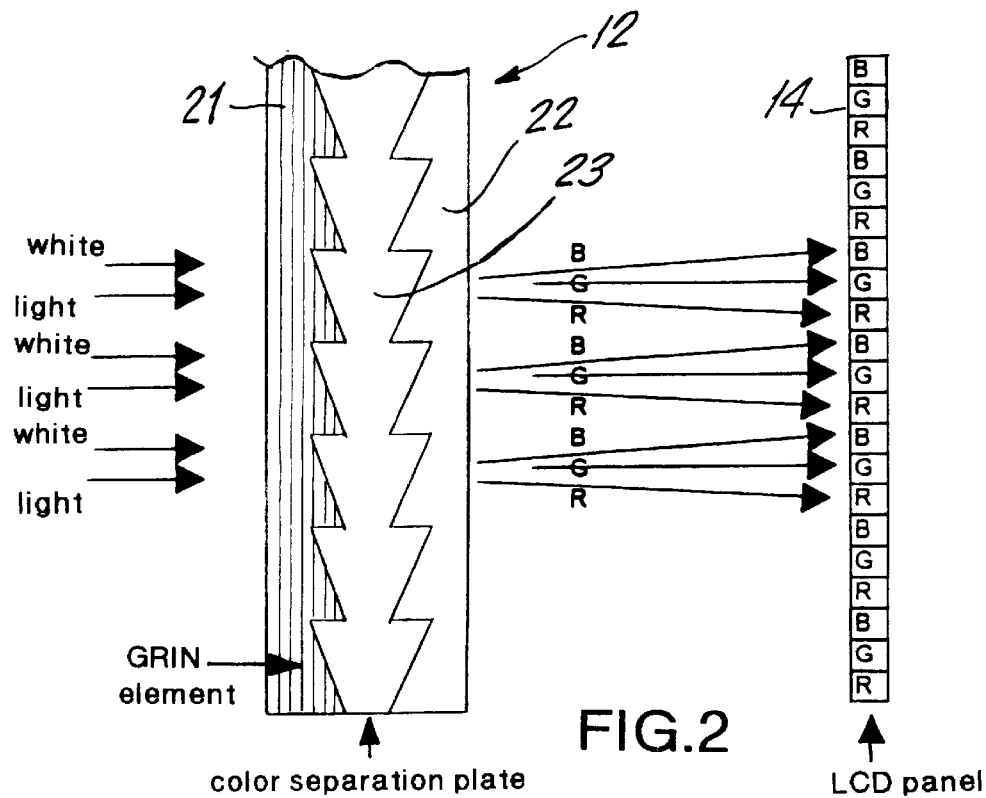
FIG. 2 is a top cross-sectional view of a color separation plate and an LCD panel.

The color separation plate 12, as shown in an enlarged top cross-section in FIG. 2, comprises an array of direct vision microprisms (prisms), which are "direct view prisms". Each microprism of the array is a narrow column direct vision prism. It is preferably a Wernicke prism having three prism elements and flat parallel entry and exit faces. There is one direct vision microprism for each column of three sub-pixels (RGB) of the LCD panel 13. Consequently, a direct vision microprism array plate has at least 200 microprisms when each microprism is an elongated column, and has about the same number of microprisms as the number of columns of pixels of the LCD plate, i.e., 480 for VGA, 600 for SVGA, 768 for XGA and 1924 for EWS. If pixel resolution is N×M (N=640, M=480 for VGA) M "saw teeth" (column microprisms) are required on the face. Each column microprism illuminates N pixels (3N sub-pixels). Alternatively, and not shown, the array may be formed by aligning individual microprisms side-by-side with an individual microprism for each pixel, i.e., 307,200 microprisms for a 640×480 VGA-LCD panel.

Figure 21:
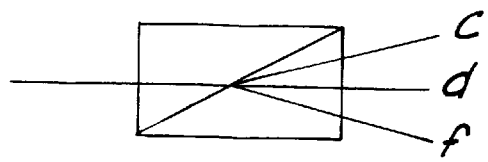
FIG. 21 is a side view of a direct view two element Zenger prism.

A direct vision prism is an optical device that produces a visible spectrum which emerges from the prism aligned with the incident light. It breaks up white light into its RGB components. The central color G from each microprism emerges about parallel to the incident light. The simplest type of direct vision prism consists of a combination of two prisms, one a crown glass and the other a flint glass of FIG. 21. The angles of the prisms are chosen by using the two different indices of refraction and requiring that a chosen wave length will propagate through the combination with no net deflection of path. FIG. 21 shows a two element Zenger direct view (dispersion) prism having flat entry and exit faces (flat being perpendicular to the center optical axis of the incident light). A Wernicke prism is a direct vision prism, essentially two Zenger prisms back-to-back, consisting of three prisms with suitably chosen indices of refraction so that the front and rear surfaces are flat and parallel to each other. These prisms may require additional lenses to form an image of the spectrum. The preferred direct vision microprism is a Wernicke prism and the drawings FIGS. 2, 3, 5A, 6B, 8 and 9 illustrate a type of Wernicke prism. In the embodiment of FIG. 2 the GRIN sheet 21 also bends the incident white rays toward each other, as in the embodiment of FIG. 4. That effect may be sufficient so that a separate entrance microlens plate is not needed to collimate the light. However, the invention also may use other types of direct view prisms. For example, FIG. 10 shows an alternative direct vision prism which obtains a wider separation of the colors. It uses five prism elements along each optical axis and therefore is more complex, and costly, than the three prism elements of the preferred Wernicke prism of FIGS. 2, 3, 6A and 6B. FIG. 21 shows an alternative direct view prism which uses only two prisms.

Figure 5B:
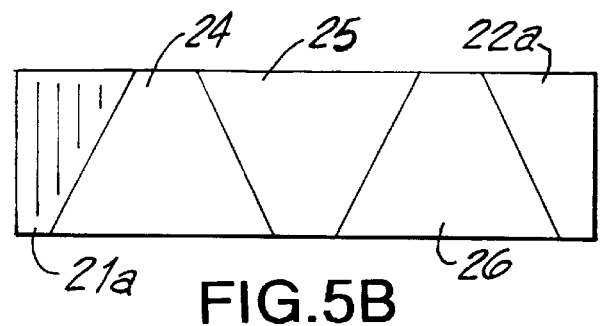
FIG. 5B is a top cross-sectional view of a five-element direct vision prism in which the entry prism is a GRIN element.

As shown in FIGS. 2, 3, 5A and 6B, the entry prism 21 and exit prism 22 are preferably truncated triangles (in cross-section) and the center prism 23 is preferably a truncated triangle (in cross-section). This permits the prisms to be formed as plates (flat sheets). Similarly, in the five-prism structure of FIG. 5B, the entrance prism 21a, exit prism 22a, second prism 24, third prism 25 and fourth prism 26 are truncated triangles. The figures, for clarity, in FIGS. 2, 3 and 5A, show only seven microprisms in cross-section. However, each color separation plate has at least 200 microprisms; one microprism for each column of pixels of the LCD panel.

Preferably the direct view prisms are formed using GRIN (Gradient Index). In GRIN an axial gradient prism, or lens, has an index of refraction profile which varies in one direction only, usually chosen to be the optical axis. The most preferred embodiment, shown in FIG. 2, is a direct vision Wernicke microprism array of at least 200 microprisms. Each microprism is formed with a truncated triangle (in top cross-section) to form three plates (flat sheets), at least one of which is a GRIN plate and which are joined together to form a unitary color separation plate. Gradient index of refraction prisms (GRIN) may have a large index of refraction and prescribable profiles. The term "gradient index" refers to varying the index of refraction from place to place within the optical element, i.e., lens prism, etc. For example, glass GRIN lens blanks may be produced by fusing and diffusion of stacked thin layers of glass, or glass frits (powders) at high temperature, of progressively different indices of refraction. Any index jumps at the original boundaries of the layers are smoothed, i.e., become step-free, after controlled diffusion. See U.S. Pat. Nos. 4,883,522; 4,907,864; 5,044,737; 5,262,896 and 5,236,486, incorporated by reference.

The blanks for the fabrication of such gradient lenses can be made by a variety of processes such as SOL-GEL, infusion, and diffusion and may be glass, plastic or other suitable optical material. A controlled diffusion process can produce macro lenses with a prescribable index of refraction axial profile, as disclosed in U.S. Pat. No. 5,262,896.

The lens blanks, in glass, may be as thick as 2 mm, diameters from 8 mm to 120 mm, and with difference in index of refraction of from 0.1 to 0.25 and possibly 0.5. Generally the fusion temperature is just above the softening point of the lower index glass layer, for example, 600° to 800°.

This discussion of GRIN applies to both spherical and cylindrical lenses; however, the grinding and polishing of cylindrical lenses to the needed precision is especially difficult. Cylindrical lenses condense or expand a beam of light in one transverse dimension only; they can focus light into a thin line and are used in laser scanners, fax machines, laser printers, and in the Cinemascope process. As mentioned above, and as shown in FIGS. 3 and 5A, the entrance and exit microlens array plates 11 may use cylindrical lenses.

In the preferred embodiment of the invention, the color separation plate is a transparent segmented array lens having a flat front surface, a flat rear surface and a plurality of parallel optical axes. The plate includes first and second planar sheets of optical material such as glass or plastic. The first planar sheet includes first and second sides and is a GRIN sheet having an axial gradient index of a selected refraction profile. The second planar sheet has a series of corresponding parallel grooves which mate with the grooves of the first sheet to form a continuous optical interface with no air gaps. This provides an array lens which takes an input of a light beam and produces an output of a series of line foci. It breaks the incident white light into RGB which are at angled line foci at the exit of the color separation plate. This plate has the functionality of an array of parallel cylindrical lenses. The optical power, and the optical function of the color separation plates, is provided by prescribing the index of refraction values and profiles in the various sheets (segments). The difference in index between the adjoining sheets produces a desired bend in an incident light ray path if it strikes the interface at a non-normal angle. Thus the interfaces are set at a finite angle to the optical axis.

The three sheets (plates) forming the gradient Wernicke prism color separation plate 12 in theory may be fabricated in the following manner: The front gradient sheet 21 is fabricated by a GRIN process. The middle and rear sheets 23, 22 have a homogeneous index of refraction. The rear surface of the front sheet 21 is formed with a series of grooves (saw-tooth ridges) as depicted in the figures. This possibly may be done by standard techniques. For example, saw-tooth diffraction gratings (ruled) are formed at a given angle (blazing angle) by an interferometrically controlled ruling engine using a diamond cutter to form grooves on an optically flat aluminum coated substrate forming a master. Its surface contour is transferred to an epoxy coated flat plate. Conventional groove spacing, in diffraction gratings, is about 1000 grooves per mm (millimeter or 1 micron spacing). The front surface of the second sheet 23 is either formed to fit into the front plate or formed directly on the front sheet 21, for example, by casting or molding thereon. The second interior interface (between sheets 23, 22) also has a saw-tooth structure and this is preferably fabricated in the same manner as the first interface. For example, one-half of sheet 23 may be formed on sheet 21 with a flat surface, the other half of the sheet formed on sheet 22 with a flat surface and the two flat surfaces joined to form sheet 23.

In the microprism color separation plate 12b of FIG. 3, the three plates are each internally homogeneous (without GRIN); but the index of refraction of plate 21b differs from those of plates 22b and 23b. The entry microlens plate 11 collimates the incident white light and the exit microlens plate 13 is used to focus the full color spectrum on the image plane.

Figure 20A:
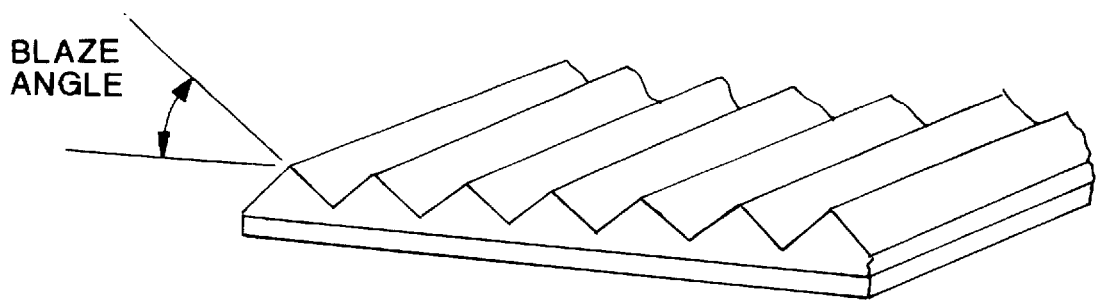
FIG. 20A is a perspective view of a portion of a microprism array.
Figure 20B:
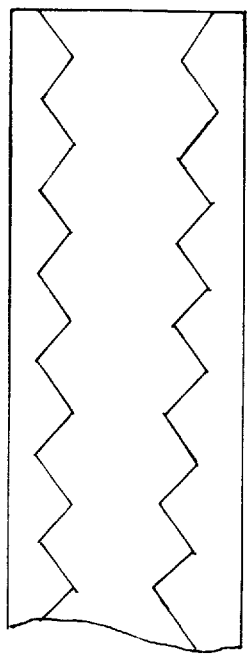
FIG. 20B is a top view of a portion of a color separation plate using the microprism array of FIG. 20A.

An alternative microprism shape for the first sheet 50, second sheet 51 and third sheet 52 is shown in FIGS. 20A and 20B. This is a saw tooth shape which is the shape used in some ruled diffraction gratings. This embodiment will produce columns of full color spectrums with alternate columns reversed, i.e., B, B-G, G, R-Y, R; then R, R-Y, G, B-G, B; then B, B-G, G, R-Y, R, etc. The electronic device, e.g., the computer, would reverse B and G to display a normal color image.

The microprism color separation panel directs its separated spectrum onto the microlens array plate 13. This plate 13 focuses the full spectrum, in columns, onto the LCD panel 14.

A microlens array is a plate having an array of convex lenses. For example, the SMILE (TM of Corning) is a plate having a row and column array of convex protrusions each of which is the microlens. It is formed by a photolithographic process to produce lens diameters in the range of 70 u to 600 u (micrometers); minimum separation between lenses of about 10 u; numerical aperture of less than 0.35; lens configurations of plano-convex and bi-convex with the areas around each microlens opaque. The refractive index is around 1.5133 (at 1150 nm wavelength).

An alternative microlens array is shown in FIG. 5A. In this embodiment the convex lens elements 40 are cylindrical lenses formed directly on the exit face of the color separation plate. These lens elements focus to form columns of full color spectrums on the LCD panel 14.

Also, in the embodiment of FIG. 5A, the entry microlens array, used to collimate the light, is a microprism array of the type shown in FIG. 4. In the embodiment of FIG. 5A the entry microlens microprism array 11A is fused directly on the entry surface of the color separation plate 11. This forms a unitary structure.

FIG. 10 is an enlarged rear view of a black-white LCD panel, without dye stripes (dye dots), having rectangular sub-pixels 50–55. The sub-pixels 50–55 are arranged (spaced apart) such that the blue portion of the rainbow (visible full color spectrum) falls on sub-pixel apertures 50 and 53, the undesired blue-green portion 56 falls on the black color absorbent matrix (black border—shown in hatching), the green falls on sub-pixels 51 and 55, the undesired yellow 57 and falls on the black matrix and the red falls on sub-pixels 52 and 57. The black matrix protects the TFT (Thin Film Transistors) of the LCD panel from the incident light. The theoretical curve for the embodiment of FIG. 10 is shown in FIG. 12.

FIG. 11A illustrates a column of a full spectrum rainbow of the type produced by a cylindrical microlens array of the type shown in FIGS. 3 and 5A. FIG. 13 shows a set of side-by-side full spectrum columns on the entry side of the LCD panel 14. Each column is the height of the active area of LCD panel. For example, if the array is 640 pixels wide (640 columns) by 480 pixels high (480 rows), then there would be 640 parallel full spectrum rainbows, each of which would be the height of the LCD panel (480 pixels). FIG. 11B illustrates the rectangular-shaped full spectrum rainbows as focused by a spherical microlens array. This is more efficient than the columns of FIG. 11A as light does not fall on the black matrix bands between rows of sub-pixels.

The RGB wave bands transmitted by RGB dye dots of a conventional color LCD panel are shown in solid lines in FIG. 12. The theoretical band transmitted by the sub-pixels of FIG. 10 are shown in dash-dash lines in FIG. 12. The present invention, in the embodiment of FIG. 10, transmits more light near the centers of each of RGB, which additional light flux is indicated by areas a–f, of FIG. 12. The eye resolves the broader bands of RGB, transmitted by the embodiment of FIG. 10, as RGB.

An alternative embodiment of the sub-pixels of an LCD panel is illustrated in FIG. 13. This embodiment is a novel structure in regard to the spacing and shape of the sub-pixels. The sub-pixels are more widely spaced and are less wide in order to permit transmission of only the center frequencies of the RGB bands. The sub-pixels are preferably in the range of 20 to 50 microns wide (w) and most preferably about 30 microns; and preferably in the range of 40 to 80 microns high (h), see FIG. 13. This embodiment produces less light, since it reduces the light flux compared to the embodiment of FIG. 10. However, its colors may be more saturated since they are from a more narrow band of color.

The present invention provides a novel backlighting panel comprising an array of side-by-side light pipes (cells). A light pipe is a reflective surface which transmits light from an entry orifice to an exit orifice and mixes the light by internal reflection. The light pipe may be hollow or solid transparent (glass or plastic) and has internal reflecting walls. The reflection of the light entering the light pipe from the pipe's reflecting walls mixes the entry light. Preferably an integral multiple of three LED (Light Emitting Diodes) generating R,G and B spectral bands of light are positioned near the light pipe's entry orifice. The light pipe mixes the RGB to produce "white light" at the exit orifice. However, that white light is mixed RGB and is not a true white light as it does not contain the B-G and R-Y portions of the spectrum. Since those portions are not utilized by the LCD panel, their absence permits a saving of power compared to a white light source generating a full color spectrum. The term "white light" means true white light or mixed RGB.

The most preferred light pipe (basic element or cell) is a hollow, six-sided cavity with a hexagonal exit aperture. It operates as a "reverse concentrator". The principle of this light pipe is somewhat similar to that of the parabolic concentrator, described in Winston and Welford's 1978 textbook, "The Optics of Non-Imaging Concentrators". However, here we are using the concentrator backwards, converting a wide-angle emission from the LED to a limited-angle beam. Light is taken from a wide angle source and converted to a beam of limited angle population. The six facets are approximately parabolic in shape, and are generated as segments of a "parabolic" cylinder.

Figure 15:
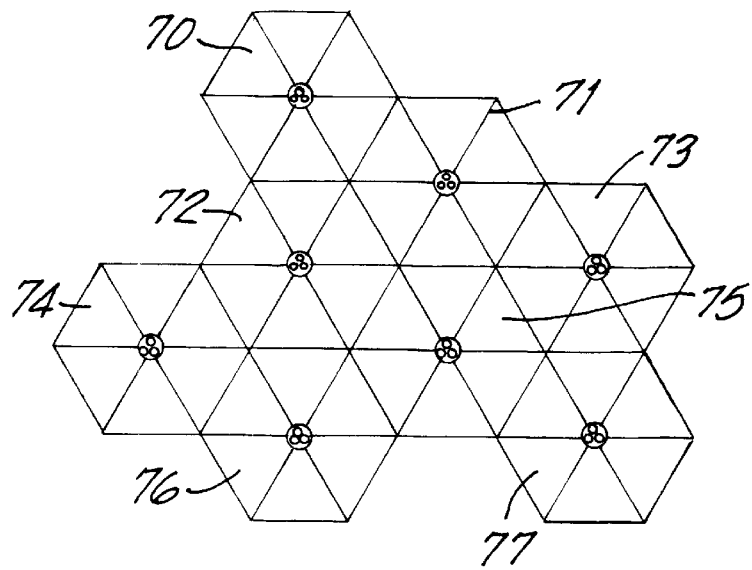
FIG. 15 is a front plan view of a portion of the honeycomb illuminator panel.
Figure 16:
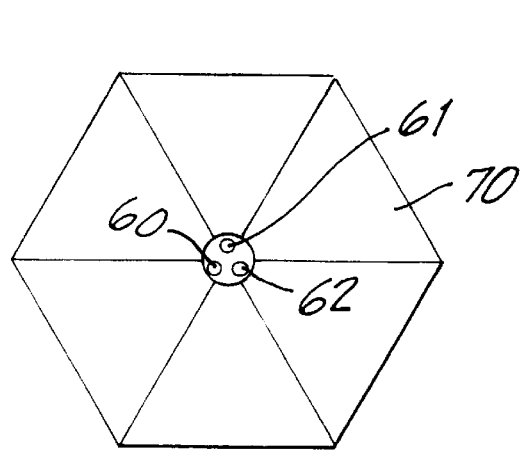
FIG. 16 is an enlarged front plan view of one light pipe (cell) of the illuminator panel of FIG. 15.
Figure 17:
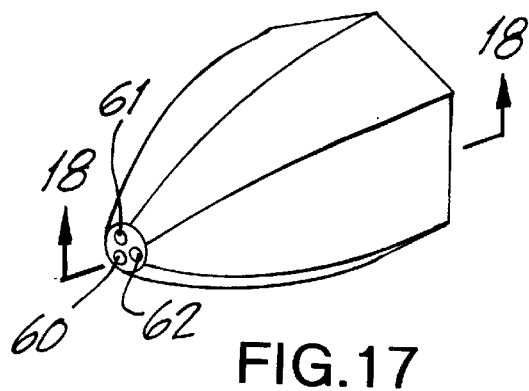
FIG. 17 is a perspective view of the light pipe of FIG. 16.
Figure 18:
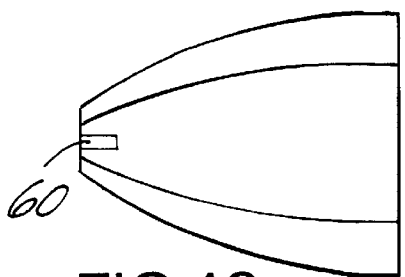
FIG. 18 is a cross-sectional view taken along 18—18 of FIG. 17.

Preferably each of the hexagonal light-pipes (cells) 70–77, at its exit aperture, is in the range of 1–5 cm high, most preferably about 3 cm; and its length preferably is in the range of 3–7 cm and most preferably about 5 cm, see FIGS. 17 and 18. The hexagonal light-pipes are formed in a side-by-side array. That array forms a flat backlighting panel whose entrance face consists of LEDs (FIG. 16) and whose exit face (exit plane), shown in FIG. 15, is a flat face providing white light which is mixed RGB light.

There is a finite boundary region formed by the reflective walls of the cell matrix. A space is provided between the exit plane of the honeycomb and the entry plane of the color separator panel so that angled rays can mix and fill in the spaces.

The exact size and shape of the light pipe is designed in detail after one has selected the LEDs. The first choice, as with any illumination system, is the choice of the light source itself. There are available LED chips (diodes) generating RGB from Texas Optoelectronics, Inc. and from others.

Figure 19:
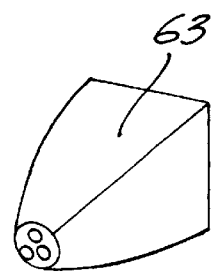
FIG. 19 is a perspective view of an alternative light pipe for use in an illuminator panel.

An alternative light pipe 63, having a round entry aperture 64 and a square outlet aperture 65, is shown in FIG. 19. It would also be formed into a backlighting plate consisting of an array of side-by-side light pipes, each of the form illustrated in FIG. 19.

The backlighting panel, for example, of the honeycomb panel of FIGS. 15–18, may be used without the color separation plate. It can supply light of low angle population to a conventional three-color transmissive LCD panel, in which each sub-pixel includes a color filter. There are commercially available color LCD panels and drivers. The major limitation, as to size, is the LCD size limit. Eventually larger LCD panels may be available.

The backlighting panel using the honeycomb light-pipe (cell) array is preferred for use with the GRIN-Wernicke color separation plate.

In order to work properly, light entering the color separator should have a very small angle population. The honeycomb array of FIGS. 15–18, supplies light at an appropriate angle population over the entire area of the GRIN-Wernicke color separation plate/LCD panel. With three separated wavelengths from the red/green/blue LEDs, we can create a beam that is visually "white".

The light pipe array does not generate true white light (full color spectrum). The light-pipe array, and its RGB LEDs, generate what appears to a viewer to be white light; but has blank spaces (B-G and Y-R) in its wave length content.

Light emerging from the LCD panel, using the above-described illuminator plate, will have a narrow angle population. The angle properties of the output beam can be modified, with only about 8% loss, by a holographic diffuser designed to spread light into an appropriate region. For a single viewer, as in an aircraft or emergency vehicle, this can be a very limited space. For two viewers side-by-side, the beam can be spread horizontally, to reach both, while keeping the vertical spread smaller. In this way light may be conserved and optimum apparent brightness provided at the display surface, without throwing away light energy into unused regions.

Holographic diffusers are now manufactured by a costly laser process, in small sizes. They can be made with varying angle "aspect ratios" to direct light into target areas that may be square, tall and thin, or short and wide It is always possible to use conventional diffusers, which spread light the same in both directions. For example, a diffuser may be a sheet of plastic with a matte finish, like a sheet of drafting vellum which is available in varying degrees of "fuzziness" for large or small angle spread.

Theoretical Treatment

Figure 6A:
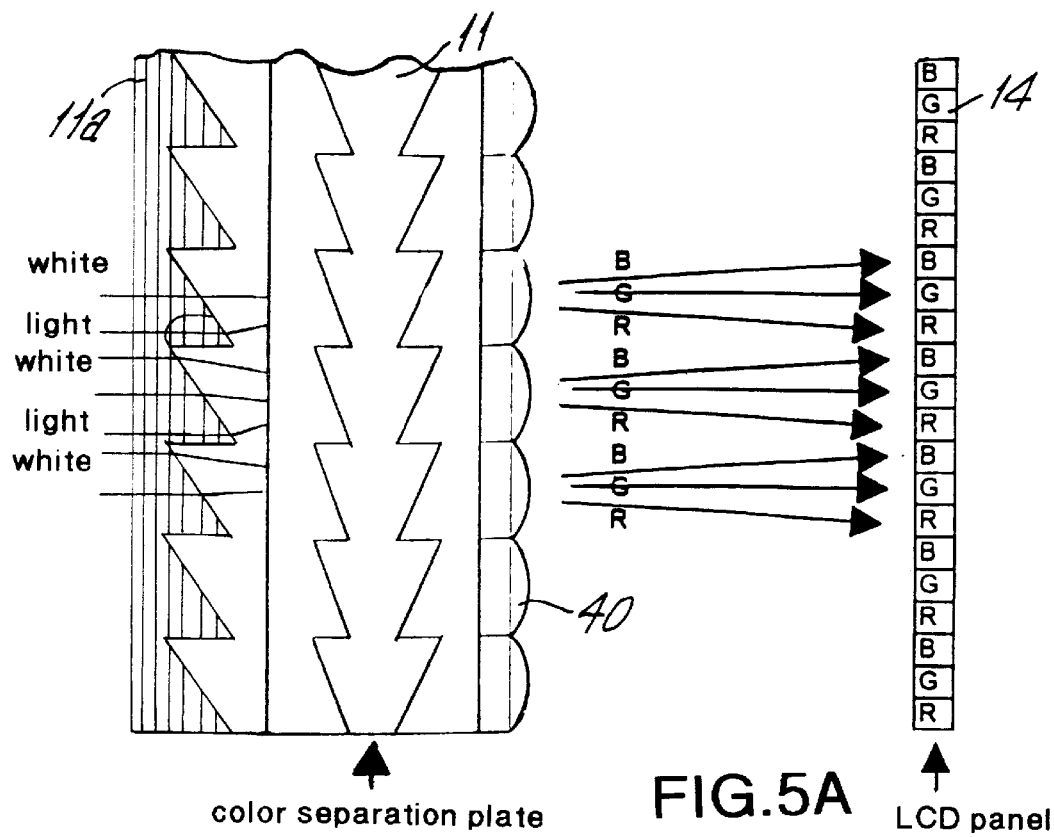
FIG. 6A is an exploded top cross-sectional view of a three-element Wernicke prism in which the entry prism is a GRIN element.
Figure 6A:
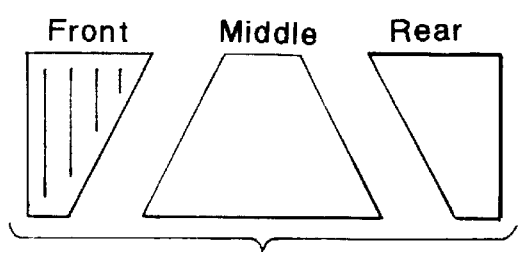
Figure 6B:
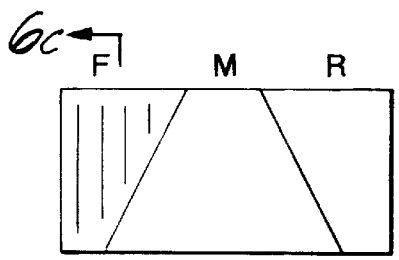
FIG. 6B is an assembled GRIN-Wernicke microprism of the prisms of FIG. 6A.
Figure 6C:
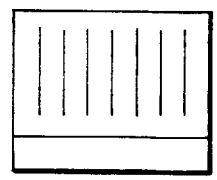
FIG. 6C is a cross-sectional view taken along line C—C of FIG. 6B.

A prism array is an aligned collection of single prisms, each of which has exactly the same optical behavior. Thus, the optical properties of an array can be understood and described in terms of the behavior of a single prism. A schematic side view of a single Gradient Index Wernicke prism is shown in FIGS. 6A and 6B. The Wernicke prism is two back-to-back Zenger prisms. As shown in FIG. 21, a Zenger prism has only two prism elements and flat entry and exit faces It may be possible, especially using GRIN to produce the color separation plate using an array of Zenger microprisms.

Figure 7:
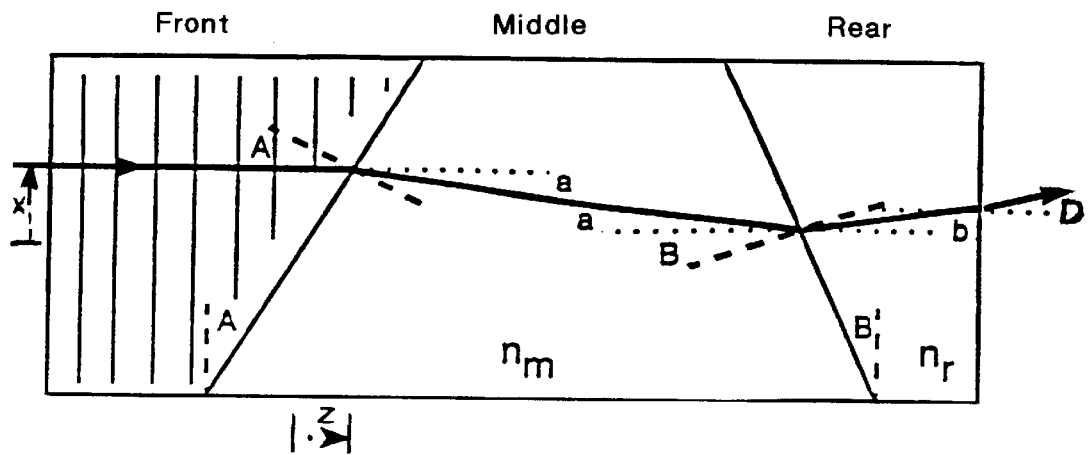
FIG. 7 is an enlarged cross-section of the GRIN-Wernicke prism of FIG. 6B.

An exploded view of the Wernicke prism is shown at FIG. 6A and followed by a view of the assembled optical element at FIG. 6B. The geometry of the following theoretical treatment is given in FIG. 7. This will not be an exact treatment, but it will prove quite accurate and useful in determining the overall parameters and the index of refraction profile required. Exact calculations can be performed by several commercially available optical design packages. The index of refraction in the front element depends only upon z, the distance along the optical axis. Snell's law of refraction for a normally incident ray at a distance x from the central optical axis of each Wernicke prism then leads to the relations:

$n_f(z)\sin A = n_m \sin(A-a)$ $n_m \sin(B+a) = n_r \sin(B-b)$ $n_r \sin b = \sin D(x)$, where z=x tan A along the interface between the front and middle prisms. These equations determine the deflection angle D(x). These equations can be solved exactly using standard numerical methods and/or commercial crystal design computer software. However, the operation of the invention can be best illustrated by solving the equations using the limits of small angles. Thus, in the limit of small angles A and B in radians, the relation becomes:

$D(x) = A(n_f(z) - n_m) + B(n_r - n_m)$.

Figure 8:
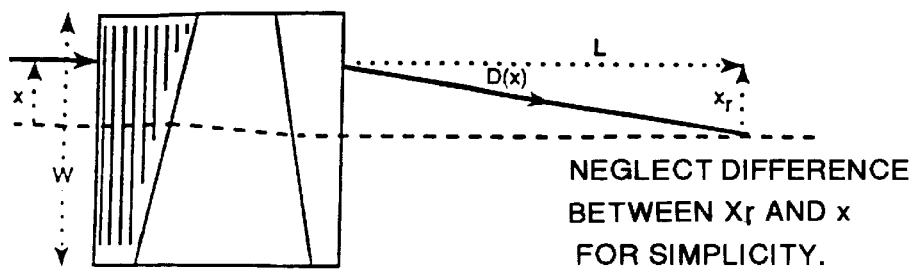
FIG. 8 shows a schematic of focus using a top cross-sectional view of a GRIN-Wernicke prism.

Referring to FIG. 8, it is clear that in order to form an image at a distance L from the rear surface and at a height h above the optical axis, the deflection angle should be of the form $D(x) = (h-x)/L$ Thus, if the index profile is of the form $n_f(z) = n_f(0) - n_f^1 z = n_f(0) - A n_f^1 x$ then $$\frac{1}{L} = A^2 n_f^1 \text{ and } h = LD(0) = L[A(n_f(0) - n_r) + B(n_r - n_m)].$$

Thus, the image distance L depends upon the angle A and the slope of the index profile. The height from the optical axis, h, depends additionally upon the three indices of refraction, $n_f(o)$, $n_m$ and $n_r$. The linear index profile is therefore seen to act as a cylindrical lens element.

The chromatic properties of optical material are characterized by the Abbe number which is defined in terms of the index of refraction at three different wave lengths, usually denoted by f, d, and c which are in the blue, yellow and red respectively. The Abbe number v is defined by n(f)−n(c)= [n(d)−1]/v. Now consider the deflection angle D for the central ray (x=0) for the three standard wave lengths, denoted by D(f), D(d) and D(c). Direct manipulation of the above yields the relation $$D(f) - D(c) = A[n_f(d) - 1]\left(\frac{1}{v_f} - \frac{1}{v_m}\right) + B[n_r(d) - 1]\left(\frac{1}{v_r} - \frac{1}{v_m}\right) + \frac{D(d)}{v_m}.$$

Figure 9:
FIG. 9 is a top cross-sectional view of a GRIN-Wernicke prism in which the triangular prism elements are not truncated.
Figure 14:
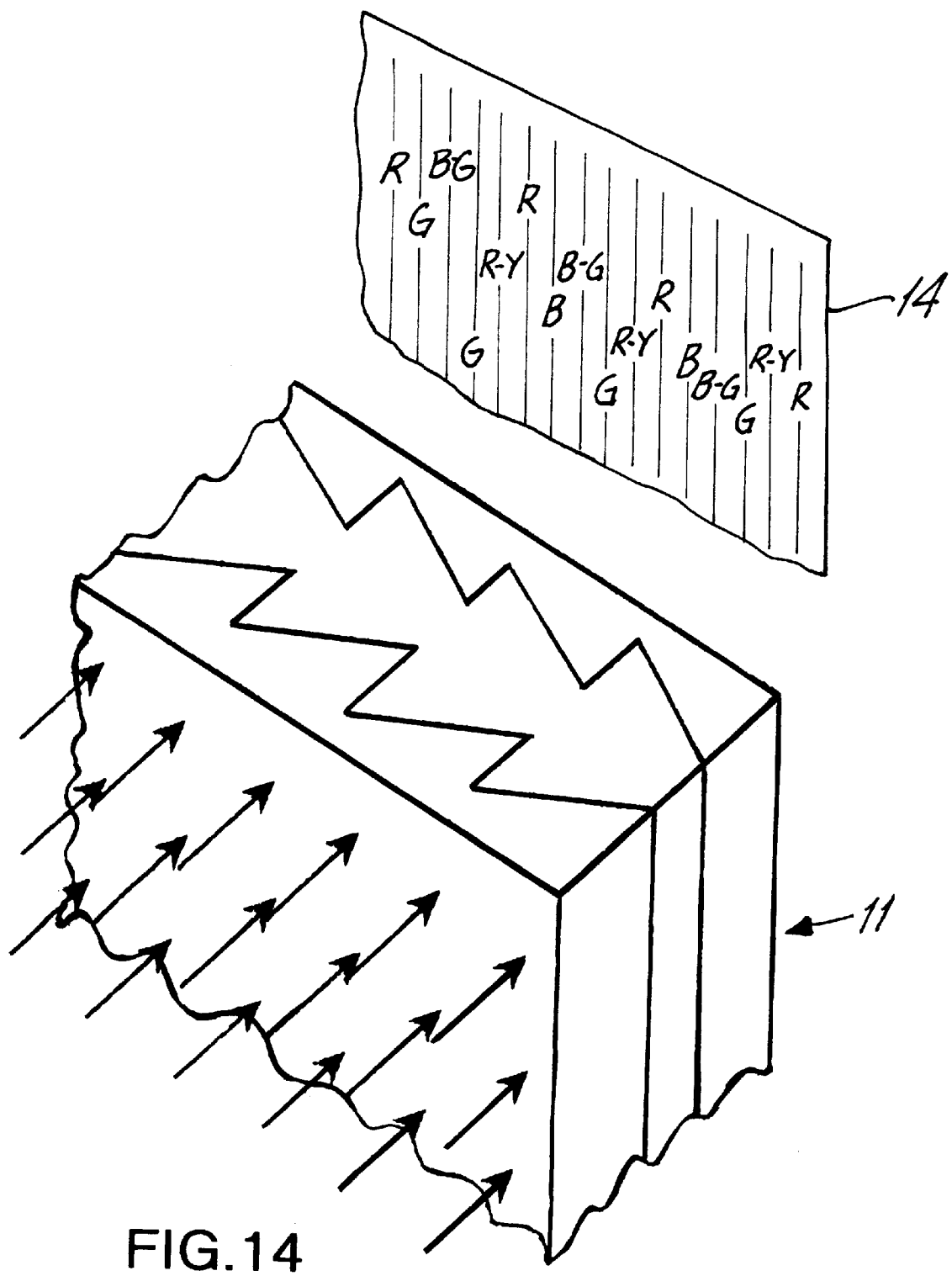
FIG. 14 is a perspective view of a small portion of the GRIN-Wernicke microprism color separation plate and the entry side of an LCD panel showing side-by-side columns of full color spectrums cast on the LCD panel by the color separation plate.

Thus, it is seen that the gradient Wernicke prism with an appropriate linear index profile can form an image of a separated spectrum without additional lens elements. Note that to maximize the separation between D(f) and D(c), the Abbe values for the front and rear layers should be small, and the Abbe number for the middle layer should be as large as possible. A schematic design utilizing commercially available glasses is shown in FIG. 9. This design was produced by the optical design code "ZEMAX" from Focus Software, Inc. of Tucson, Ariz. The parameters were found to be close to those predicted by the above approximate treatment.

It is clear that if multiple gradient index Wernicke prisms are arranged in an array, the image will be a repeated linear column of spectra. Each gradient Wernicke prism will form a complete spectrum. The image will be a vertical continuous spectrum of repeated full spectra, i.e., B, B-G, G, Y-R, R;

B,B-G,G,Y-R,R, etc., etc. In a 640×480 array, for VGA resolution, there would be 640 side-by-side vertical full spectra, each 480 pixels high.

What is claimed is:

1. A color image projection system comprising, in named sequence, means to generate white light, a color separation plate, an LCD (Liquid Crystal Display) panel, a projection lens and a screen, characterized in that the color separation plate is an array of transmissive direct vision microprisms, each microprism comprising at least a first prism of one index of refraction and a second prism of a different index of refraction.

2. A color image projection system as in claim 1 wherein the microprisms are GRIN (Gradient Index) Wernicke prisms.

3. A color image projection system as in claim 1 wherein the LCD panel has three proximate sub-pixels which form each pixel, the LCD panel has at least ten thousand pixels, and each microprism separates the white light into Red, Green and Blue (RGB) spectral components and the system includes means to direct each RGB component through a respective sub-pixel of each pixel.

4. A color image projection system as in claim 1 wherein the array comprises at least three hundred microprisms.

5. A color image projection system as in claim 1 wherein the color separation plate comprises three superimposed sheets each sheet having at least one face of microgrooves to form the microprisms.

6. The combination of an LCD (Liquid Crystal Display) having at least ten thousand TFT (Thin Film Transistor) light valves and a color separation plate to direct light on the LCD, the separation plate comprising an array of at least three hundred transmissive direct vision microprisms, each microprism comprising a first prism of one index of refraction and a second prism of a different index of refraction.

7. The combination as in claim 6 wherein the microprisms are GRIN (Gradient Index) Wernicke prisms.

8. The combination as in claim 6 wherein the LCD panel has three proximate sub-pixels to form each pixel and each microprism separates the white light into Red, Green and Blue (RGB) spectral components and the system includes means to direct each RGB component through a respective sub-pixel.

9. The combination as in claim 6 wherein the microprisms are Wernicke prisms.

10. The combination as in claim 6 wherein the color separation plate comprises three superimposed sheets, each sheet having at least one face of microgrooves thereon to form the microprisms.

11. The combination as in claim 6 wherein the color separation plate comprises three superimposed sheets, at least one of the sheets being a GRIN (Gradient Index) element.

12. The combination as in claim 6 and further comprising a microlens array positioned between the LCD panel and the color separation panel and proximate the color separation panel.

13. A color image direct view system, comprising, in the named sequence, means to generate white light, a color separation plate and an LCD (Liquid Crystal Display) panel, characterized in that the color separation plate is an array of transmissive direct vision microprisms, each microprism comprising a first prism of one index of refraction and a second prism of a different index of refraction.

14. A color system as in claim 13 wherein the microprisms are GRIN (Gradient Index) Wernicke prisms.

15. A color system as in claim 13 wherein the LCD panel has three proximate sub-pixels to form each pixel and each microprism separates the white light into Red, Green and Blue (RGB) spectral components and the system includes means to direct each RGB component through a respective sub-pixel.

16. A color system as in claim 13 wherein the array comprises at least three hundred microprisms.

17. A color system as in claim 13 wherein the color separation plate comprises three superimposed sheets, each sheet having at least one face of microgrooves thereon to form the microprisms.

18. A color system as in claim 13 wherein the color separation plate comprises three superimposed sheets, at least one of the sheets being a GRIN (Gradient Index) element.

19. A color system as in claim 13 and further comprising a microlens array positioned between the LCD panel and the color separation panel and proximate the color separation panel.

20. A color system as in claim 13 and further comprising a microlens array positioned between the means to generate white light and the color separation plate.

21. A direct view system as in claim 13 wherein the means to generate white light is an illuminator panel comprising at least nine side-by-side light pipes, each light pipe having an entry and exit face, and RGB (Red,Green,Blue) LEDs (Light Emitting Diodes) positioned at each entry face to illuminate each light pipe with RGB light.

* * * * *